Nov. 20, 1951     H. B. RAPP     2,575,563
CONTROL SYSTEM FOR WHEELED
MECHANICAL-LIFT IMPLEMENTS
Filed April 14, 1947     2 SHEETS—SHEET 2
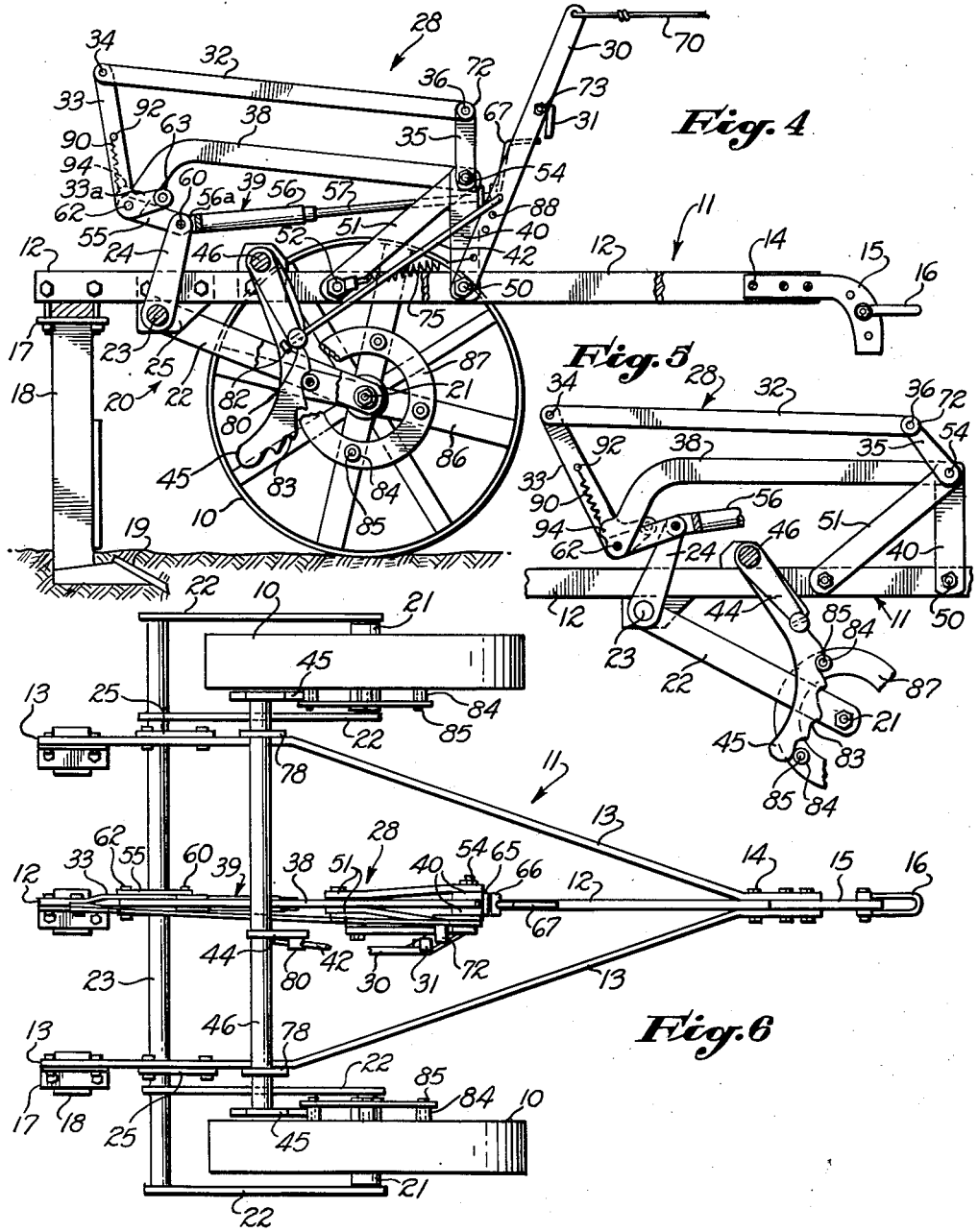
INVENTOR:
HOWARD B. RAPP
By His ATTORNEYS
HARRIS, KIECH, FOSTER & HARRIS Patented Nov. 20, 1951

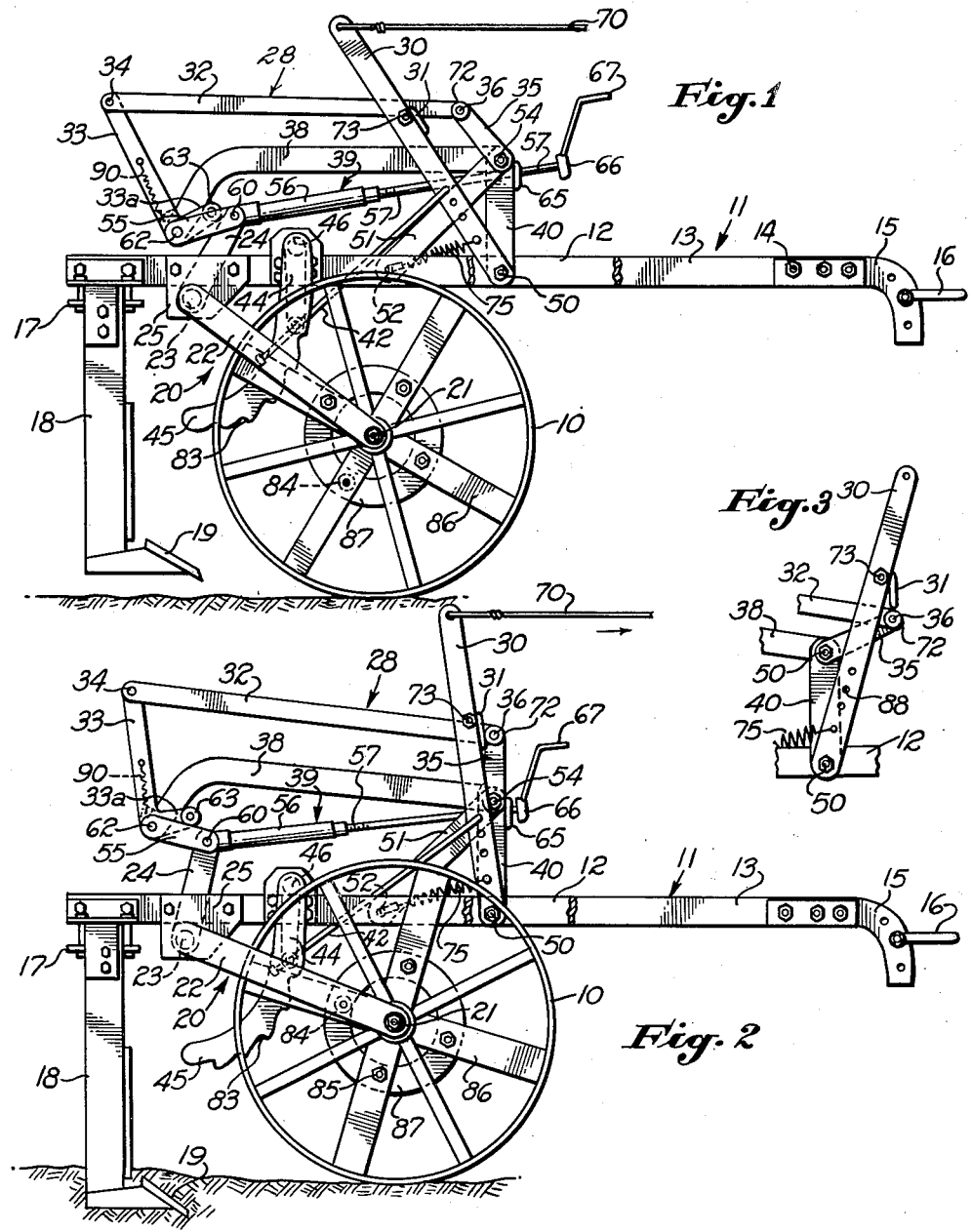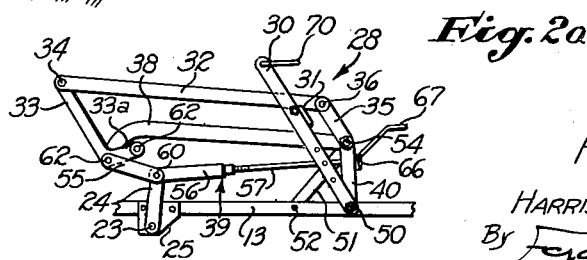

2,575,563

UNITED STATES PATENT OFFICE 2,575,563

CONTROL SYSTEM FOR WHEELED MECHANICAL-LIFT IMPLEMENTS

Howard B. Rapp, Santa Ana, Calif., assignor to Towner Manufacturing Co., Santa Ana, Calif., a partnership Application April 14, 1947, Serial No. 741,218

23 Claims. (Cl. 97—72)

1

This invention relates to control mechanisms for earth working implements supported upon ground wheels and adapted to be raised and lowered to meet various requirements.

Various types of structures have been used comprising wheeled frames which carry earth working tools such as plows, cultivators, and subsoilers, in which implements the earth working tools are adapted to be lifted for transport and lowered for tilling the soil, such tools being moved by the frames which are raised and lowered as required.

It is an object of this invention to provide means which may be easily operated by the driver of a tractive vehicle pulling the earth working implement so that raising and lowering of the tools may be accomplished through one device only.

It is also an object of the invention to provide in earth working implements of the indicated character a control mechanism easily actuable by the driver of the vehicle to set in motion both the means effective to cause lowering of the earth working tools and the means effective to raise those tools, and it is an additional object to set such means in motion by a single actuating means such as a cable.

An additional object is to provide control mechanism in an earth working implement of the type stated including a member actuable in a given direction to cause lowering of the earth penetrating tools, and also actuable in the same direction to set in motion means to effect elevation of the earth penetrating tools when desired to transport the implement from one location to another.

Another object of the invention is to provide in an implement of the stated type a movable member operable from the tractive vehicle and having means to effect lowering of the earth penetrating tools, said means being returnable to initial position without affecting the control mechanism, said movable member also including means to control elevation of the tools from the tractive vehicle.

Another object is to provide control mechanism for an implement having a rising and falling frame carrying earth working tools, such mechanism including a pivoted lever having an over-riding device operative upon a member disposed in its path to release the control mechanism for lowering of the tools, while over-riding in an opposite direction to return to initial position, and means also connected with said lever to set in motion operative mechanism for elevating said tools.

Other objects of the invention and various features thereof will become apparent to those skilled in the art upon reference to the accompanying drawings wherein one embodiment of the invention is shown for the purposes of illustration.

In the drawings:

Fig. 1 is principally a side elevation of an earth working implement possessing the features of the invention, certain forward portions being broken away to facilitate disclosure, the frame being shown in elevated position whereby to retain the earth working tools in position above the earth or roadway;

Fig. 2 is a view similar to that of Fig. 1 showing the relationship of the parts, including an actuating lever, immediately following the dropping of the frame to place the tools in earth working position;

Fig. 2A is a fragmentary view similar to that of Fig. 2 showing the parts when in normal earth working position;

Fig. 3 is a fragmentary view illustrating the lever as it moves from the position of Fig. 2 to the position of Fig. 4;

Fig. 4 is a view similar to that of Fig. 2, the parts being shown in position preparatory to elevating the frame and tools by forward movement of the ground wheels;

Fig. 5 is a fragmentary view similar to that of Fig. 4 and showing the relation of the parts as the frame is elevated into the inoperative position of Fig. 1; and Fig. 6 is a plan view, the parts being shown approximately in the relationship of Fig. 4.

The structure illustrated comprises ground wheels 10 and a frame generally indicated at 11 which includes a longitudinally extending middle bar 12, and two forwardly converging side bars 13, the forward ends of the bars 12 and 13 being bound together by bolts 14 which also secure between the forward extremities of the side bars 13 a tongue 15 which carries an eye or clevis 16 adapted for attachment to a tractive implement, such as a power driven tractor. The rear end of each bar 12 and 13 of the frame 11 is provided with an appropriate conventional bracket 17 and a standard 18 upon whose lower end a conventional earth working tool 19, such as a subsoiler, is secured.

The wheels 10 are carried upon a bell crank assembly 20 of the crank axle type comprising short axles 21 upon which the wheels 10 are directly journaled, each axle 21 being carried between spaced supporting crank arms 22 which are secured, as by welding or the like, to a transverse crank shaft 23 to which in turn is fixedly secured, as by welding or the like, a single, upstanding, actuating crank arm 24. The crank shaft 23 is journaled upon the bars 12 and 13 of the frame 11 in any appropriate manner as by being mounted in bearing brackets 25 bolted to the respective bars of the frame.

Upon the frame 11 the control mechanism of the present invention is primarily mounted, such control mechanism being indicated in general by the reference number 28. This control mechanism comprises an actuating lever 30 carrying a dog 31, a connecting bar 32 which constitutes a draw bar, a bell crank 33 which constitutes a trip device, to one end of which the connecting bar 32 is pivotally attached as by a pivot bolt 34, a swinging arm 35 to which the other end of the connecting bar 32 is pivotally connected as by a pivot pin 36, an offset anchor bar or beam 38, a jointed linkage 39, a braced upstanding mounting 40 comprising spaced bars fixed on the middle bar 12, and a pull rod 42 which is connected at one end with the actuating lever 30 and at the opposite end with a crank arm 44 for actuating ratchet-like cockscombs 45 through a rock shaft 46 by which the frame 11 is elevated by the wheels 10 as they advance.

In practice, it is convenient to mount the lower end of the lever 30 upon a bolt 50 which serves as a fulcrum for the lever 30 and at the same time secures the lower end of the mounting 40 to the middle bar 12. The mounting 40 is braced by appropriate bracing means shown as arms 51 whose lower ends are secured to the middle bar 12 by a bolt 52. The upper ends of the arms 51 are secured to the upper end of the mounting 40 by a bolt 54 which serves also to pivot the lower end of the swinging arm 35 and as a pivot for the forward end of the anchor beam 38.

As illustrated, the linkage 39 comprises a short bracing link 55 hingedly connected to an elongated adjustable jack screw element comprising an internally threaded sleeve 56 and an externally threaded screw shaft 57 which enters the sleeve. The sleeve 56 and the link 55 are pivotally connected by a hinge joint formed by a pivot pin 60 which extends through the upper end of the crank arm 24 and also through two spaced members which constitute the bracing link 55 as well as through ears 56a provided on the respective end of the sleeve 56. The bracing link 55 has its other end pivotally connected as by a bolt 62 with the rearward end of the offset anchor beam 38. This pivot bolt 62 also serves as a bearing for the bell crank 33. The bell crank 33 is formed of two spaced bars whose upper ends are secured together by the pivot bolt 34, and whose lower ends 33a lie at opposite sides of the anchor beam 38 and are offset forwardly so that their forward extremities serve to carry between them a bearing roller 63 adapted to be forced against the upper end of the crank arm 24 when the bell crank 33 is actuated forward by the draw bar 32.

The forward end of the screw shaft 57 is loosely mounted in a stop block 65 (Figs. 1 and 6) fixed at the forward edge of the mounting 40, which mounting is conveniently formed of two spaced bars (Fig. 6) spaced by the stop block 65 and between which the screw shaft 57 loosely passes. The stop block 65 is adapted to be engaged by a head 66 fixed on the forward end of the screw shaft 57 in such manner as to engage the stop block 65 under appropriate conditions such as illustrated in Fig. 2. The head 66 also provides a convenient mounting for a crank handle 67 by which the screw shaft 57 may be located and adjusted. These parts, including the jack screw sleeve 56 and the screw shaft 57, serve the purpose of controlling the amount of movement of the crank arm 24 and the other members of the crank axle 20. Thus, such adjustment serves to limit the rearward movement of the crank arm 24, thereby limiting the descent of the frame 11 and the tools 19 relative to the wheels 10 and the supporting crank arms 22. Similarly, when the parts are in the position of Fig. 1, shortening of the jack screw by turning the screw shaft 57 to bring the head 66 against the stop block 65 will prevent all movement of the crank arm 24 and thereby retain the parts of the crank axle 20 in such relationship, so that the frame 11 and the tools 19 cannot be accidentally released by the draw bar 32 and the bell crank trip 33, or otherwise.

For the purpose of rendering the mechanism operable, the screw shaft 57 is actuated by the handle 67 to withdraw the head 66 from the stop block 65 an appropriate distance, such as indicated in Fig. 1, so that the actuating lever 30 may be swung about the pivot bolt 50 from the position of Fig. 1 and through the position of Fig. 2 to the positions of Figs. 3 and 4. In order to actuate the lever 30, a cable 70 is attached to the upper end thereof, this cable being attached to extend to the tractor or other vehicle pulling the implement, so that the cable 70 may be actuated by the driver, or otherwise as required. When draft is placed upon the cable 70 and the lever 30 is drawn forward from the position of Fig. 1 toward the position of Fig. 2, the swinging dog 31 is brought into contact with a roller 72 which is carried on a projecting end of the pivot pin 36 so that the roller 72 projects into the path of arcuate movement of the dog 31. The dog 31 is swingingly mounted upon the lever 30 by a pivot pin 73, and, since the dog is in the form of a small flat plate, a side portion of the plate is extended to overlie the lever 30 so that the adjacent edge of the lever 30 acts as a stop whereby to cause the dog 31 to serve as a driver for the roller 72 and hence for the connecting draw bar 32 leading to the bell crank trip 33. When movement of the lever 30 brings it approximately to the position of Fig. 2, the dog 31 will have advanced the roller 72, the bar 32 and the bell crank trip 33 to a position approximately as indicated in Fig. 2. During the initial portion of the advance of the bell crank trip 33, the roller 63 on the end of the crank arm 33a of the bell crank trip 33 will have been forced against the adjacent edge of the crank arm 24, with which it engages as seen in Fig. 1, so that the continuing movement forces the rearward end of the anchor beam 38 upward with respect to the crank arm 24 and the joint provided by the pivot pin 60, thereby freeing the crank arm 24 so that it moves to a position such as indicated in Figs. 2 and 4 thereby to permit the frame 11 and the tools 19 to drop. As above indicated, the amount of this movement is limited by the head 66 when it strikes the stop block 65 as determined by the adjustment of the screw shaft 57. For normal earth working operations, the cable 70 will be released so that the lever 30 may return to initial position under the influence of a spring 75 which is attached at one end to the lower end of the lever and at the other end to the adjacent portion of the frame as by means of the bolt 52 securing the lower ends of brace members 51.

When it is desired to elevate the frame 11 and the tools 19, it is required to advance the lever 30 forward about the pivot bolt 50 a sufficient distance to cause the pull rod 42 to actuate the arm 44 and the cockscombs 45 into a position such as shown in Figs. 4 and 5. To effect this movement the roller 72 is advanced by swinging movement of the arm 35 about the pivot bolt 54 so that, by reason of the small arc which the roller 72 describes in movement of the short arm 35 (Fig. 3), the dog 31 may pass over the top of the roller 72 so as to move from the position of Fig. 3 to the position of Fig. 4. In the latter position the dog 31 hangs suspended from its pivot 73 as seen in Fig. 4. Under these conditions, the crank arm 44, which is affixed to the rock shaft 46 journaled in brackets 78 on the members of the frame 11, actuates the depending cockscombs 45 which also are fixed on the shaft 46, as by welding. This movement is effected through the pull rod 42 only when the lever 30 is moved to such a position as indicated in Fig. 4, by reason of a lost motion connection of the rearward end of the pull rod 42 with the lower end of the arm 44. As shown, this is conveniently accomplished by extending the rod 42 through an opening in a mounting 80 rotatably mounted in the free end of the arm 44. Thus, the lower end of the pull rod 42 slides through the mounting 80 between the position of Fig. 1 and the position of Fig. 4. When the lost motion has been taken up, a head 82 strikes the mounting 80 so that the arm 44 advances from the position of Fig. 2 to the position of Fig. 4 thereby advancing the cockscombs 45 from the position of Fig. 2 to the position of Fig. 4. Such movement of the cockscombs 45 brings respective notches 83 thereof into engagement with spacer sleeves 84 carried on bolts 85 secured to the spokes 86 of the wheels and retaining rings 87 carried by the bolts 85. Proper movement to effect the desired engagement may be adjusted by providing a series of holes 88 in the lower end of the lever 30 for the purpose of receiving the corresponding end of the pull rod 42.

The cockscombs 45 having been brought into proper driving engagement with the sleeves 84 on the wheels 10, forward draft of the implement to cause rotation of the wheels 10 causes the cockscombs to be elevated, thereby elevating the frame 11 and the tools 19. When such elevation has been effected the anchoring parts including the anchor beam 38 are returned to their original position, this being illustrated in Fig. 5. At this time release of the cable 70 will cause the spring 75 to become operative and the parts will all be returned to the position of Fig. 1, the hinged dog 31 over-riding the roller 72 as the lever 30 returns to its initial position. For the purpose of insuring return of the connecting draw bar 32 and the bell crank trip 33 to initial position with respect to the anchor beam 38, following the tripping of the parts as indicated in Fig. 2, an appropriate spring 90 is employed, as best illustrated in Fig. 5. This spring 90 has its upper end secured to a cross pin 92 extending through the spaced members of the bell crank trip 33, its lower end being secured in an aperture provided in an outstanding boss 94 on the outer or left edge of the left end of the anchor beam 38. The location of the aperture which provides the point of attachment of the lower end of the spring 90 to the boss 94 is as far to the left of the center line through the pivots 34 and 62 and the cross pin 92 as possible whereby to insure return of these parts to the position illustrated in Figs. 1, 2a, and 5, where the roller 63 at the end of the crank arm 33a engages the adjacent under edge of the anchor beam 38. The spring 90 serves also to insure elevation of the roller 63 from a position where it might drop down to be locked against the crank arm 24, which might occur due to jolting of the implement under various conditions.

In general, the operation of the structure of the present invention has been indicated above. Stated more briefly, the screw shaft 57 will originally have been threaded into the sleeve 56 when the parts are in the position of Fig. 1 to bring the head 66 on the forward end of the screw shaft 57 into engagement with the stop block 65 on the forward side of the mounting 40 so as to prevent movement of the bell crank arm 24 and of the crank axle structure 20, whereby to prevent accidental movement of the arm 24 and consequent lowering of the frame 11 and its tools 19. For the purpose of cultivation or other soil working operation, the operator will have actuated the screw shaft 57 through its handle 67 to extend the shaft to a position such as illustrated in Fig. 1. When the implement has been moved to position for dropping the tools 19 into the soil, the cable 70 is pulled to move the lever 30 from the position of Fig. 1 toward the position of Fig. 2 so that the dog 31 on the lever 30 engages and drives the roller 72 and the connecting draw bar 32 whereby to move the bell crank trip 33 and cause the roller 63 on the forward end of its arm 33a to engage the rear edge of the crank axle arm 24 and cause relative depression of the pivot pin 60 and corresponding elevation of the anchor arm 38 so as to drive the joint provided by the pivot pin 60 below dead center between the pivots provided by the pivot bolts 62 and 54 at the ends of the anchor bar 38. The implement frame 11 then falls by reason of corresponding movement of the crank axle structure 20 including the arm 24 to provide for penetration of the tools 19 into the soil to such a depth as is permitted by the adjustment of the screw shaft 57 and its head 66 through the crank handle 67. The lever 30 is then allowed to be returned by its spring 75 to initial position, the spring 90 being relied upon to return the connecting draw bar 32, the bell crank trip 33, and the roller 63 as desired.

When it is desired to elevate the implement frame 11 and the tools 19, the cable 70 is again actuated to move the lever 30 forward, the parts passing through the position of Fig. 2 and the position of Fig. 3 until the swinging dog 31 clears the roller 72 on the upper end of the swinging arm 35, following which the lever 30 advances to the position of Fig. 4, thereby causing the pull rod 42 to move the cockscombs 45 into engagement with the sleeves 84 on the elevating bolts 85 carried by the wheels 10. Forward movement of the implement is then effected so that rotation of the wheels 10 elevates the parts into the position of Fig. 5 where the frame 11 is anchored in the elevated position of Fig. 1. Release of the cable 70 permits the spring 75 to return the lever 30 to the position of Fig. 1, the dog 31 swinging upon its pivot 73 and over-riding the roller 72 as it returns to such initial position.

From the foregoing it will be apparent that I have provided a control mechanism for implements of the indicated character, through which mechanism lowering and raising of the frame and tools thereby carried are effected by a single lever or equivalent device and a single cable or equivalent draft device.

Since various improvements of the invention herein disclosed will occur to those skilled in the art, it is intended to cover all modifications falling within the scope of the claims.

I claim as my invention:

1. Control mechanism for an implement having ground wheels carried by a crank axle and a frame adapted to be raised and lowered, said mechanism comprising in combination: a mounting fixed on said frame; an anchor bar having one end pivotally mounted on said mounting; a linkage comprising two links connected together at one end of each by a hinge joint disposed in general between the ends of said anchor bar, the other end of one link being movably connected to said mounting in the vicinity of the pivotal connection of said anchor bar thereto, the other end of the other link being pivoted on the other end of said anchor bar, said hinge joint being bodily movable to opposite sides of a dead center between the pivotal connections of the opposite ends of the anchor bar; trip means carried on one end of said anchor bar for dislodging said hinge joint and moving it through dead center; arm means for connecting said hinge joint to said crank axle and for locking said frame in elevated position by said anchor bar when said joint is returned past dead center; a longitudinally shiftable bar; a link shiftably connecting one end of said shiftable bar with said frame, the other end of said shiftable bar being connected with said trip means to actuate the latter; and movable engaging means mounted on said frame for engaging said shiftable bar to actuate the same in one direction and to disengage the latter following such actuation.

2. A combination as in claim 1 wherein said engaging means includes a pivoted lever and said wheels and frame are provided with cooperating means for elevating said frame, the combination including link means connected with said means for effecting elevation and said lever to render said elevating means operable upon movement of said lever beyond bar-actuating position.

3. A combination as in claim 1 wherein said engaging means is a lever pivoted upon said frame and provided with over-riding clutch means to move said shiftable bar in one direction and to pass the shiftable bar in the opposite direction.

4. A combination as in claim 3 including: means for effecting elevation of said frame from a lowered position; and force transmitting means attached to said lever and connected with said means for effecting elevation to actuate the latter into operating position by movement of said lever beyond bar-actuating position.

5. Control mechanism for an implement having ground wheels carried by a crank axle and a frame adapted to be raised and lowered, said mechanism comprising in combination: a mounting fixed on said frame; an anchor beam having one end pivotally mounted on said mounting; a link having one end pivoted to the other end of said anchor beam, the opposite end of said link having a joint movable through dead center between the pivotal connections of the two ends of said anchor beam; brace means connecting said joint with said crank axle to brace said frame in elevated position on said anchor beam through said link and joint when at one side of said dead center; trip means to displace said joint through said center for lowering of said frame; a connecting bar attached at one end to said trip means to actuate the latter, and having its other end swingingly connected through intervening link means to said frame; a lever mounted to swing on said frame; and clutch drive means on said lever to engage said bar and move the same to actuate said trip means, said clutch drive means including means adapted to release said bar upon predetermined movement in one direction and to ride past said bar in the opposite direction.

6. A combination as in claim 5 wherein said wheels and frame have interengaging means for elevating said frame, the combination including link means attached to said lever and connected with said elevating means to move the latter into operating position upon predetermined movement of said lever.

7. A combination as in claim 5 wherein said other end of said connecting bar is pivoted on the swinging end of an arm pivoted on said fixed mounting, said arm being mounted to swing on a different arc from the arc of movement of said lever, projecting means being provided adjacent the swinging end of said arm to lie in the path of said drive means on said lever during a portion of the swinging movements of said arm and lever and to become disengaged upon said predetermined movement.

8. A combination as in claim 7 wherein said wheels and frame have cooperating means for elevating said frame, the combination including force transmitting means attached to said lever and connected with said elevating means to move the latter into operating position upon predetermined movement of said lever.

9. A combination in a control mechanism for an implement having a frame and ground wheels mounted on a crank axle carried by the frame: anchor means for connection with said crank axle to hold said frame elevated with respect thereto; trip means to release said frame with respect to said anchor means; a longitudinally shiftable actuating bar connected with said trip means to actuate the same; movable means to move said actuating bar a predetermined distance; and clutch means on said movable means disposed in position to engage said bar for movement of said bar, and also disposed with relation to said bar to disengage and release said bar upon movement through said predetermined distance.

10. A combination as in claim 9 including means movably mounting said clutch means on said movable means for over-riding of said clutch means to clear said bar upon return movement following said movement through a predetermined distance.

11. A combination as in claim 9 including sliding lost motion means connected with said movable means for actuating frame-elevating means into operative position by further movement of said movable means beyond said predetermined distance.

12. In combination in control mechanism for an implement having wheels, a frame adapted to be raised and lowered, a crank axle, and means on said frame and wheels for elevating the frame: anchor means for connection with said crank axle to hold said frame elevated with respect thereto; trip means to release said frame with respect to said anchor means; a longitudinally shiftable actuating bar connected with said trip means to actuate the same; a lever to be movably mounted on said frame; movable means on said lever to engage and shift said actuating bar; and lost-motion means connected with said lever for connection with said frame-elevating means to engage and move said frame-elevating means to elevating position following predetermined movement of said lever.

13. A combination as in claim 12 wherein said movable means to engage said actuating bar includes an over-riding clutch member adapted to disengage said bar upon predetermined movement and adapted to over-ride said bar upon return movement, and said lost-motion means includes a rod on said lever and means on said frame elevating means to be engaged by said rod upon further movement beyond said predetermined movement.

14. In combination in a control mechanism for an implement having ground wheels, a frame adapted to be raised and lowered, and means to hold the frame elevated: trip means to release said holding means for lowering of the frame; an actuating bar attached at one end to said trip means to actuate the same for lowering said frame; swinging means for swingingly mounting the other end of said bar upon said frame; and movable means to be mounted upon said frame and adapted to be moved to engage said bar and move the same for actuation of said trip means, said movable means being a swinging member having an over-riding member adapted to engage a projecting portion of said bar to drive the bar in one direction and to over-ride the projecting portion in the opposite direction.

15. In combination in a control mechanism for an implement having ground wheels, a frame adapted to be raised and lowered, and means to hold the frame elevated: trip means to release said holding means for lowering of the frame; an actuating bar attached at one end to said trip means to actuate the same for lowering said frame; swinging means for swingingly mounting the other end of said bar upon said frame; and movable means to be mounted upon said frame and adapted to be moved to engage said bar and move the same for actuation of said trip means, said movable means comprising drive means to move said bar, said drive means including clutch means releasable from said bar on predetermined movement in one direction and adapted to clear said bar on return movement.

16. In combination in a control mechanism for an implement having ground wheels, a frame adapted to be raised and lowered, means to raise the frame, and means to hold the same elevated: trip means to release said holding means for lowering of the frame; an actuating bar attached at one end to said trip means to actuate the same for lowering said frame; swinging means for swingingly mounting the other end of said bar upon said frame; movable means to be mounted upon said frame and adapted to be moved to engage said bar and move the same for actuation of said trip means; and lost-motion means connected with said movable means and with said means to raise said frame to actuate said frame raising means following initial movement of said movable means to move said bar.

17. In combination in a control mechanism for an implement having ground wheels, a frame adapted to be raised and lowered, and means to hold the frame elevated: trip means to release said holding means for lowering of the frame; an actuating bar attached at one end to said trip means to actuate the same for lowering said frame; means for swingingly mounting the other end of said bar upon said frame; a lever adapted to be mounted upon said frame to swing alongside said bar; projecting means on said bar; and drive means on said lever and movable in the path of said projecting means to engage the latter to move said bar and actuate said trip means, said drive means being movable to clear said projecting means on return movement of said lever.

18. A combination as in claim 17 wherein said implement is provided with means engageable with said ground wheels to elevate said frame, the combination including means attached to said lever and connected with said elevating means to move the latter into operating position upon selective movement of said lever to a predetermined position.

19. In combination in a control mechanism for an implement having ground wheels, a frame adapted to be raised and lowered, means for connecting the frame and wheels to elevate the frame, and means for holding said frame in elevated position: trip means to release said holding means for lowering said frame; an actuating bar attached at one end to said trip means to actuate the latter for lowering said frame; a swinging arm to be pivoted at one end on said frame, the other end of said bar being attached to the swinging end of said arm; a lever adapted to be mounted upon said frame to swing alongside said bar; projecting means on said bar; drive means on said lever and movable in the path of said projecting means to engage the latter to move said bar and actuate said trip means, said drive means being movable to clear said projecting means on return movement of said lever, said drive means being movable on a larger arc than the swinging end of said arm whereby to disengage said projecting means upon predetermined movement; and means connected with said lever and adapted for connection with said elevating means to place the latter in elevating condition following disengagement of said projecting means by said drive means.

20. A combination as in claim 19 wherein the means for connection with said elevating means is a pull rod having lost motion connection means for engagement with said elevating means.

21. A combination as in claim 19 wherein said drive means comprises a swinging dog for over-riding said projecting means upon return movement.

22. In combination in control mechanism for an implement having a crank axle, ground wheels on said axle, and a frame carrying said axle and adapted to be raised and lowered with respect to said wheels: an anchor beam offset between its ends, one end of said beam being pivoted upon said frame; a brace link having one end pivoted on the other end of said beam and its other end swingable through a dead center between the pivots of said beam to and from a position within the offset, in which position said link braces the weight of said frame in elevated position; a crank arm on said crank axle; a pivot joint attaching the upper end of said arm to the swinging end of said brace link and cooperating with said link to brace said weight; and trip means to dislodge said joint from said offset for lowering of said frame.

23. A combination as in claim 22 including an adjustable link connected at one end to said joint and slidably connected at its other end to said frame whereby to control swinging of said crank arm and brace link between a position preventing movement thereof and preventing lowering of said frame and a position providing for maximum movement of the crank axle and maximum lowering of the frame.

HOWARD B. RAPP.

REFERENCES CITED

The following references are of record in the file of this patent:

UNITED STATES PATENTS

| Number | Name | Date |
| --- | --- | --- |
| 1,266,753 | Altgelt | May 21, 1918 |
| 2,359,600 | Altgelt | Oct. 3, 1944 |